(12) United States Patent
Jennings, Jr. et al.

(10) Patent No.: US 7,325,726 B2
(45) Date of Patent: Feb. 5, 2008

(54) SYSTEM AND METHOD FOR DETECTING FRAUDULENT USE OF STORED VALUE INSTRUMENTS

(75) Inventors: Kenneth E. Jennings, Jr., Davie, FL (US); John K. McDonough, Boca Raton, FL (US); Peter A. Pridgeon, Plantation, FL (US); Keith Newbrough, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 359 days.

(21) Appl. No.: 11/128,115

(22) Filed: May 11, 2005

(65) Prior Publication Data

US 2006/0255125 A1    Nov. 16, 2006

(51) Int. Cl.
  *G06K 5/00* (2006.01)
(52) U.S. Cl. .............. 235/380; 235/383; 235/382; 235/379
(58) Field of Classification Search .............. 235/380, 235/383, 382, 382.5, 379, 487
See application file for complete search history.

(56) References Cited

U.S. PATENT DOCUMENTS

| | | | |
|---|---|---|---|
| 6,547,132 B1 | 4/2003 | Templeton et al. | |
| 6,827,260 B2 | 12/2004 | Stoutenburg | |
| 6,886,742 B2 | 5/2005 | Stoutenburg | |
| 2002/0153414 A1 | 10/2002 | Stoutenburg | |
| 2003/0222135 A1 | 12/2003 | Stoutenburg | |
| 2004/0193551 A1 | 9/2004 | McGee et al. | |
| 2005/0061889 A1 | 3/2005 | McGee et al. | |
| 2005/0170814 A1* | 8/2005 | Joao et al. ................. | 455/411 |
| 2005/0197958 A1* | 9/2005 | Miles ......................... | 705/41 |

* cited by examiner

*Primary Examiner*—Steven S. Paik
(74) *Attorney, Agent, or Firm*—Townsend and Townsend and Crew LLP (57) ABSTRACT

The present invention is generally directed to systems and methods for detecting unauthorized or fraudulent use of stored-value instruments. A stored-value instrument can be any instrument (tangible or intangible) that may be associated with a debit account and/or may otherwise be presented for payment for goods and/or services, used to transfer money, etc. The systems and methods of the invention generally involve processing request activity through a predetermined rule set to ascertain whether the activity is potentially unauthorized or fraudulent. The systems and methods of the invention allow for real-time monitoring of request activity for potentially unauthorized or fraudulent use of stored-value instruments.

18 Claims, 3 Drawing Sheets

SYSTEM AND METHOD FOR DETECTING FRAUDULENT USE OF STORED VALUE INSTRUMENTS

BACKGROUND OF THE INVENTION

This application relates generally to stored-value instruments. More specifically, this application relates to methods and systems for detecting fraudulent use of stored value cards.

Stored value, gift, or other pre-paid metered accounts associated with debits cards are well-known for providing access to goods and services. For example, gift cards may be purchased from various merchants such as Target®, Wal-Mart®, Starbucks®, Sears®, Blockbuster®, and the like. Pre-paid debit cards are also frequently purchased for telephone services. The purchase and usage of pre-paid debit cards has continued to increase in recent years to the point that the sale of pre-paid debit cards today is a multi-billion dollar industry. Pre-paid cards, such as gift cards issued by a merchant, are advantageous to the merchant because customers using them are more likely to shop the merchant and also more likely to spend beyond the initial value of the gift card. Other prepaid cards may be issued by a bank or money transfer office, and may be used like a credit card to make purchases, up to the balance maintained within the card account.

In some cases, pre-paid debit cards are printed and issued with a predetermined value and balance, and typically sold as a retail item. An example of one such a card is a pre-paid gift card which provides an individual with a set dollar amount for the purchase of goods from a particular merchant. In other cases, a gift card may be printed without a predetermined value, but when it is purchased and activated the customer pays for the amount of money to be "loaded" onto the card.

Clearinghouse arrangements have been set up to handle gift card accounts on behalf of merchants. For example, ValueLink, L.L.C., a unit of First Data Corporation, provides database services that merchants may access for activating and maintaining gift card accounts. When the card is purchased, the card is electronically read (e.g., by reading a magnetic stripe and/or printed bar code on the card) by the merchant to activate the account at the database. Once activated, the card is used to make purchases (redemptions) by reading the card at the time of purchase and debiting the purchase amount from the account.

In recent years, stored-value cards have become increasingly popular among consumers. The steadily increasing demand for such cards, in the form of prepaid gift cards and other types of stored-value cards, has resulted in an increased number of merchants offering stored-value cards for sale. This success in marketing stored-value cards has, however, spawned a variety of fraudulent practices related to these cards.

There is, accordingly, a general need in the art for methods and systems to provide detection of unauthorized or fraudulent uses of such stored-value instruments.

BRIEF SUMMARY OF THE INVENTION

To address these and other needs, the present invention provides systems and methods for detecting the unauthorized or fraudulent use of stored-value instruments.

Thus, in one aspect of the invention, a method for detecting potential unauthorized or fraudulent use of a stored value instrument is provided. Methods of the invention generally comprise: receiving at least one request related to at least one stored value instrument identifier; compiling predetermined information concerning the request based on the type of request made; processing the compiled information through a predetermined rule set to thereby determine whether there is a likelihood of potential unauthorized or fraudulent use of the at least one stored value instrument based on the predetermined rule set; and setting a flag if potentially unauthorized or fraudulent use of a stored-value instrument is detected in accordance with the predetermined rule set. In certain embodiments, the flagging may result in a hold being placed on the stored-value instrument identifier or deactivation of the stored-value identifier. In other embodiments, the flag may result in the source of the request being blocked from making further requests.

In one embodiment, the rule set may comprise: (i) no more than a predetermined, selectable number of balance inquiries related to a single stored-value instrument identifier during a predetermined, selectable period of time; (ii) no more than a predetermined, selectable number of balance inquiries from a single ANI designation or IP address during a predetermined, selectable period of time; (iii) no more than a predetermined, selectable number of transactions of a predetermined, selectable value in a predetermined, selectable geographic locale during a predetermined, selectable period of time; (iv) no more than a predetermined, selectable number of transaction requests related to an inactive stored-value instrument identifier; (v) no more than a predetermined, selectable number of transaction requests related to a stored-value instrument identifier associated with a zero balance; (vi) no more than a predetermined, selectable number of transaction requests related to a single stored-value instrument identifier from POS terminals during a predetermined, selectable period of time; and (vii) no more than a predetermined, selectable number of activation requests related to a single stored-value instrument identifier.

In another aspect of the invention, a system for detecting potential unauthorized or fraudulent use of a stored-value instrument is provided. Systems of the invention generally comprise: means for receiving at least one request related to at least one stored-value instrument identifier number; means for capturing predetermined information concerning the at least one request based on the type of request made; a database comprising a predetermined rule set useful to determine whether there is a likelihood of potential unauthorized or fraudulent use of the at least one stored value instrument based on the predetermined rule set; and means for setting a flag if potential unauthorized or fraudulent use of the stored-value instrument is detected in accordance with the predetermined rule set.

In one embodiment, the means for receiving at least one request may be an automated telephone balance inquiry system, an on-line balance inquiry system, a POS terminal, or a combination thereof. In another embodiment, the means for capturing information may comprise ANI, IP address capture, and combinations thereof. In yet another embodiment, the means for flagging may comprise a database comprising the captured information related to the request, and the flag may comprise a data flag set in the database if potential unauthorized or fraudulent use of a stored-value instrument is detected in accordance with the predetermined rule set.

These and other aspects will become apparent to one of skill in the art upon reading the disclosure.

DETAILED DESCRIPTION OF THE INVENTION

The present invention is generally directed to systems and methods for detecting unauthorized or fraudulent use of stored-value instruments. A stored-value instrument can be any instrument (tangible or intangible) that may be associated with a debit account and/or may otherwise be presented for payment for goods and/or services, used to transfer money, etc. Particular embodiments of stored-value instruments comprise stored-value cards, which may have a form factor similar to that of credit cards, etc. By way of non-limiting example, stored-value instruments, such as cards may be packaged in a manner described in detail in U.S. patent application Ser. No. 10/665,984, filed Sep. 19, 2003 by McGee et al. and entitled "Financial Presentation Instruments with Integrated Holder and Methods for Use," the entire disclosure of which is incorporated herein by reference.

A stored-value instrument will generally comprise some form of identifier, which may be sufficient to uniquely identify the stored-value instrument. Merely by way of example, a stored-value instrument may comprise a magnetic stripe and/or a bar code. The stored-value identifier, which might be a serial number and/or other string of text and/or numbers, then, might be encoded onto the magnetic stripe and/or represented by the bar code. Those skilled in the art will appreciate the variety of methods that can be used to encode/decode a magnetic stripe and/or translate a bar code. Further, those skilled in the art will appreciate that there are a number of ways known in the art to store information associated with a stored value instrument, and any of them may be used as appropriate to store the first and/or second identifiers. Merely by way of example, in some embodiments, the first and/or second identifier may be stored in various ways (such as RFID tag or chips embedded in the card, holograms, etc.) and/or any appropriate scanner, RFID reader and/or hardware may be used to obtain and/or input the first and/or second identifier. Bar codes, track data, account information, etc. may also be printed on the card, as known in the art.

In some cases, the stored-value instrument may comprise both a magnetic stripe and a bar code. The magnetic stripe may be used to store a first identifier (such as an account number associated with the instrument and/or the like), which may also be printed, embossed, etc. on the instrument. The bar code may represent a second identifier, which may have some relation to the first identifier, or may incorporate a personal account number, a personal identification number, etc. Merely by way of example, in some cases, the bar code may be a Code 128 bar code known in the art. As recognized by those skilled in the art, the identifier may also be encrypted. The encrypted value representing the identifier can be derived using any appropriate technique, of which many are known in the art. An exemplary technique may comprise 3DES encryption. As used herein, a stored-value instrument identifier can be any single identifier or combination of identifiers, such as a first identifier, second identifier, etc., or any combination thereof.

Figure 1A:
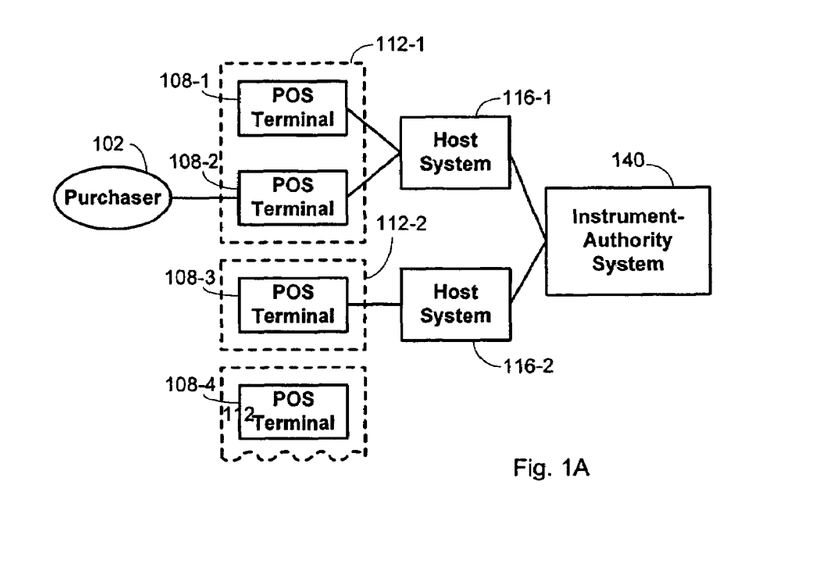
FIG. 1A illustrates a typical point-of-service (POS) type system for use in connection with the present invention.

Merely by way of example, an overview of a typical point-of-sale (POS) system that may be used to activate or perform certain transaction requests utilizing stored-value instruments is illustrated schematically in FIG. 1A. Other systems are described in U.S. patent application Ser. No. 10/405,043, filed Sep. 26, 2003 by McGee et al. and entitled "Methods and Systems for Processing Unrestricted Stored-Value Instruments," the entire disclosure of which is incorporated herein by reference. However, the invention is not so limited, and any known systems may be used in connection with the present invention, as understood by those skilled in the art.

Now, with reference to FIG. 1A, a stored-value instrument may be purchased by a purchaser 102 at a merchant location 112. Each merchant location 112 may include one or more point-of-sale (POS) terminals 108 having a capacity for reading information from the stored-value instrument. Each POS terminal 108 may be configured for interacting with an instrument-authority system 140 via a network 104, optionally through a host system 116 configured to interface directly with each of the POS terminals 108 at a particular merchant location 112. (In some embodiments, the host system 116 may be configured to perform the functions attributed herein to the instrument-authority system. In other embodiments, the host system 116 may be omitted and/or the instrument-authority system 140 may be configured to communicate directly with the point-of-sale terminals 108 via a network 104). The network 114 may comprise a wired, wireless, modem, and/or other type of interfacing connection (e.g., internet, telephony, etc.) and permits data to be exchanged between the host system 116, instrument-authority system 140, point-of-sale terminals 108, etc.

Examples of suitable POS devices that include multiple capabilities are provided in the following commonly assigned applications, the entire disclosures of which are incorporated herein by reference for all purposes: U.S. Prov. Pat. Appl. No. 60/147,889, entitled "Integrated Point Of Sale Device," filed Aug. 9, 1999 by Randy J. Templeton et al.; U.S. patent application Ser. No. 09/634,901, entitled "Point Of Sale Payment System," filed Aug. 9, 2000 by Randy J. Templeton et al.; U.S. patent application Ser. No. 10/116, 689, entitled "Systems And Methods For Performing Transactions At A Point-Of-Sale," filed Apr. 3, 2002 by Earney Stoutenburg et al.; U.S. patent application Ser. No. 10/116, 733, entitled "Systems And Methods For Deploying A Point-Of-Sale System," filed Apr. 3, 2002 by Earney Stoutenburg et al.; U.S. patent application Ser. No. 10/116, 686, entitled "Systems And Methods For Utilizing A Point-Of-Sale System," filed Apr. 3, 2002 by Earney Stoutenburg et al.; and U.S. patent application Ser. No. 10/116,735, entitled "Systems And Methods For Configuring A Point-Of-Sale System," filed Apr. 3, 2002 by Earney Stoutenburg.

In accordance with the present invention, the instrument-authority system 140 illustrated in FIG. 1A may be adapted to detect potential unauthorized or fraudulent use of the stored-value instruments as described in further detail below. For instance, the instrument-authority system may comprise or be in communication with a database that includes a predetermined rule set designed to detect potential unauthorized or fraudulent use of stored-value instruments.

Figure 1B:
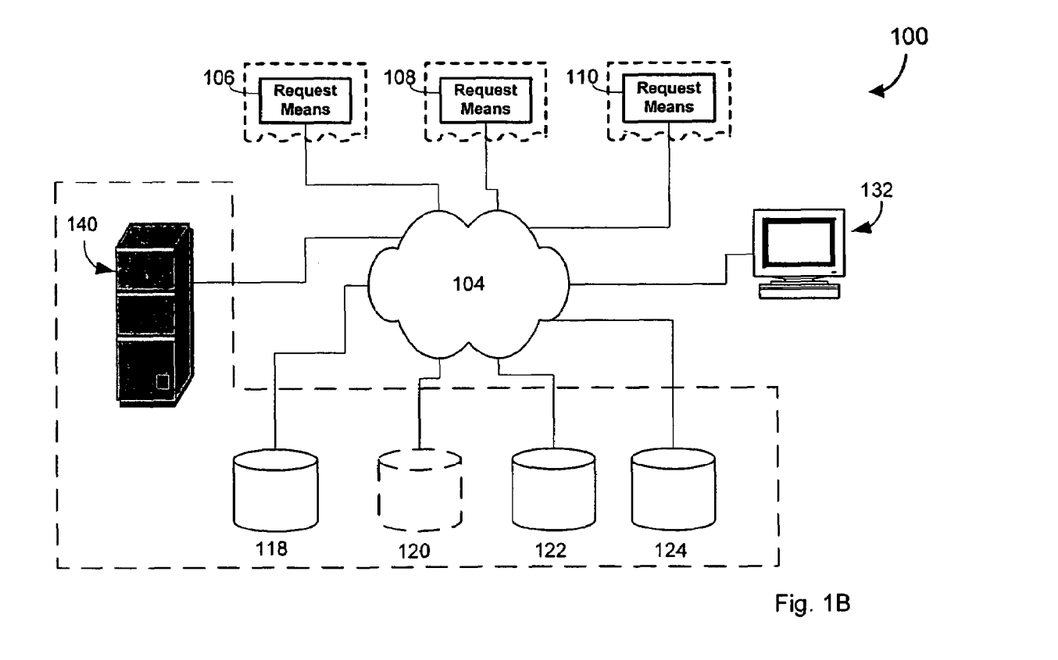
FIG. 1B illustrates an exemplary system in accordance with the present invention.

More generally, one aspect of the invention is directed to a system for detecting potential unauthorized or fraudulent use of stored-value instruments. With reference to FIG. 1B, system 100 can be implemented in a network environment (generally indicated by reference number 104). Network 104 can be any network capable of supporting communication between different computing devices. Merely by way of example, network 104 could be a local area network, an intra-network, the internet and/or any other telecommunications network, a wireless network and the like.

Exemplary system 100 comprises an instrument-authority system 140 in communication with at least one request means, e.g., 106, 108, 110, perhaps through network 104. In certain embodiments, request means 106 may, for example, be an automated telephone inquiry system which may be used to make automated balance and transaction inquiries for stored-value instruments. Suitable automated telephone inquiry systems include known interactive voice recognition (IVR) systems known in the art. As above, request means 108 may, for example, be a POS terminal. In other embodiments, request means 110 may, for example, be a computer connected via a network, e.g., the internet, to an automated inquiry system which may be used to make automated balance and transaction inquiries for stored-value instruments. Alternatively, request means 110, may be back-office software, batch files processes, mainframe processes, etc.

Instrument-authority system 140 may generally be configured as a server, however, it is understood that it may be any device that includes a processor and is capable of reading input data, processing the data in accordance with a predetermined rule set, and writing output data, as described in further detail in the embodiments below. Merely by way of example, instrument-authority system 140 can be a mainframe computer such as an IBM™ System/390™, a mid range system such as an IBM™ AS/400™, and/or server running a UNIX™ or UNIX-like operating system (including, for example, AIX™, Solaris™, and/or Linux™). In other embodiments, instrument-authority system 140 can be a personal computer, perhaps running one of a variety of Microsoft™ operating systems, and/or can be an Apple™ computer. Alternatively, instrument-authority system 140 may be a specifically configured, stand-alone unit for on-site merchant use.

In accordance with various embodiments of the invention, system 100 also includes one or more databases 118, 120, 122, 124, etc. which can be used to store a variety of information related to the inventive methods discussed herein. Those skilled in the art will appreciate that although, for purposes of clarity, databases 118, 120, 122, 124 are illustrated separately on FIG. 1B, other embodiments of the invention might incorporate all of the stored data within a single database and/or organize data structures differently than as illustrated herein. Further, although illustrated as separate physical elements in FIG. 1B, databases 118, 120, 122, 124 may alternatively be housed within instrument-authority system 140 (as indicated by the dashed line in FIG. 1B). As discussed herein, when reference is made to instrument-authority system 140 including or comprising a database, it is understood that the database may be within the computer housing itself, or may be a separate structure in communication with instrument-authority system 140.

In embodiments utilizing the information bus model discussed herein, the information discussed with respect to databases 118, 120, 122, 124 may be pushed and/or pulled from the bus, allowing for data acquisition from a wide variety of sources. The term "database," therefore, should be interpreted to mean a collection of information rather than read as a limitation to a particular physical or logical structure or organization. Databases 118, 120, 122, 124 can be in communication with instrument-authority system 140 either through network 104 (as illustrated on FIG. 1B), through direct communication (e.g., SCSI connection, etc.) and/or through any other method known in the art, so long as instrument-authority system 140 can access the information stored within databases 118, 120, 122, 124.

As will be discussed in more detail below, databases 118, 120, 122, 124 may comprise various combinations of data, predetermined rule sets, instructions, etc. for use in connection with the methods of the present invention. By way of non-limiting example, databases 118, 120, 122, 124 may comprise captured information concerning stored-value instrument identifiers, date and time of requests, request types, request mode, geographic location of request POS identifier, automatic number identification (ANI) designations, internet protocol (IP) address information, predetermined rule set definitions, "flag" status associated with a stored-value instrument identifier, ANI designation or IP address, etc. Those skilled in the art will recognize that there are a variety of ways of storing composite information in a database, any of which can be implemented in accordance with various embodiments of the invention. For instance, database 118, 120, 122, 124 can be incorporated within a software package, and instrument-authority system 140 can be configured to interface with such software package in order to assess the information stored in the database(s).

Those skilled in the art will recognize that there are a variety of ways in which instrument-authority system 140 might interface with database 118, 120, 122, 124. In a particular aspect instrument-authority system 140 can access information in database 118, 120, 122, 124 on a periodic basis or on demand. Various standardized (e.g., OOBC, SQL, XML, etc.) and/or proprietary data access methodologies known in the art may be used to access databases 118, 120, 122, 124. Further, data may either be pushed from a database or "pulled" by instrument-authority system 140.

Alternatively, databases 118, 120, 122, 124 and/or instrument-authority system 140 can engage in a practice known in the art as "push-pull" data warehousing, whereby information can be shared with and/or pulled from another source. Such data warehousing can be done within an enterprise or between multiple enterprises and can be performed using any of a variety of methods known to those skilled in the art including, merely by way of example, XML data transfers. In these and other ways, embodiments of the present invention, as discussed above, can interface with an information bus operation on an intra-company or inter-company basis, and can both pull information from that bus and push information to the information bus. Thus, systems in accordance with embodiments of the invention can easily integrate with other data management systems in the provider's network, for example by utilizing the information bus methodology described briefly herein and known to those skilled in the art.

In accordance with some embodiments, system 100 can include a computing device 132 that can be in communication with instrument-authority system 140 and that can be used, inter alia, to provide configuration and operational instructions to instrument-authority system 140. Computing device 132 can be any device known in the art that is capable of communicating with instrument-authority system 140, including, for example, a personal computer (perhaps running a Microsoft™ and/or Apple™ operating system), a personal digital assistant, a mini-computer, a workstation, a cell phone, and/or the like. Communication with instrument-authority system 140 can be through network 104 as illustrated in FIG. 1B, or alternatively, can be through some other means of communication including wireless communication, direct connection and the like. Device 132 can be used to add, delete and/or modify any of the information contained within databases 118, 120, 122, 124. For instance, device 132 can be used to add, delete, or modify rule set parameters stored in one or more databases 118, 120, 122, 124. However, in many circumstances, databases 118, 120, 122, 124 will be populated automatically, e.g., via an information bus, through the activities of other software applications or data capture services, as described below.

In another aspect of the invention, methods for detecting potential unauthorized or fraudulent use of stored-value instruments are provided. The methods generally involve processing request activity through a predetermined rule set to ascertain whether the activity is potentially unauthorized or fraudulent. In one embodiment, the methods of the invention allow for real-time monitoring of request activity for potentially unauthorized or fraudulent use of stored-value instruments. With reference to system 100 described above, instrument-authority system 140 may monitor activity via request means 106, 108, 110, etc. and flag potentially unauthorized or fraudulent activity. Certain embodiments will be discussed in more detail below with reference to FIG. 2.

Figure 2:
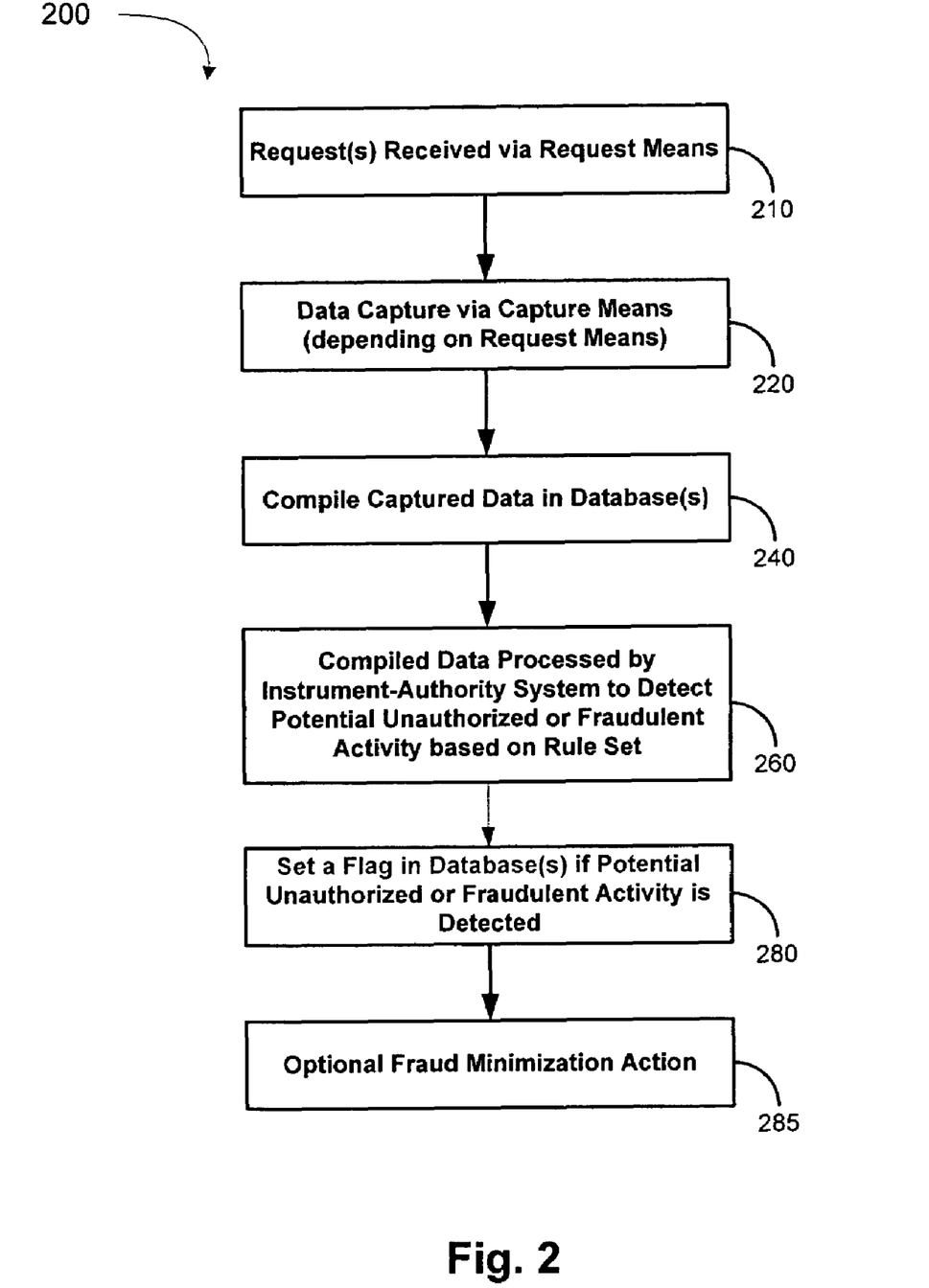
FIG. 2 illustrates an exemplary method in accordance with the present invention.

Turning now to FIG. 2, an exemplary method of the invention for detecting potential unauthorized or fraudulent use of stored-value instruments is illustrated. Although for ease of description, method 200 will be described by reference to system 100, those skilled in the art will understand that methods in accordance with various embodiments of the invention are not limited to any particular hardware or physical structure(s). In Block 210, at least one request related to at least one stored-value instrument identifier is received via, e.g., request means 106, 108, 110, etc. Based on the type of request, certain predetermined information is captured at Block 220 and compiled at Block 240 in one or more databases (e.g., database 118, 120, etc.).

The predetermined information may be captured at Block 220 in any suitable manner known in the art, depending on the type of information to be captured, e.g., automatic number identification (ANI), internet protocol (IP) address identification, POS terminal identification, etc. Further, depending on the type of request, the information which is captured at Block 220 and compiled at Block 240 may include any combination of: stored-value instrument identifier, date of request, time of request, request type (e.g., balance inquiry, debit request, purchase request, deposit request, etc.), mode of request (e.g., automated inquiry system via telephone, internet, POS, etc.), geographic location, POS identifier, ANI designation, IP address, etc. Further, the at least one request may relate to a single stored-value instrument identifier, or there may be a plurality of requests that relate to a plurality of stored-value instrument identifiers. In one embodiment, the stored-value instrument identifiers may be in sequential order, and the requests may be received in a predetermined period of time, or from a single source, e.g., a single ANI designation, IP address, or POS terminal.

Moving on, at Block 260, instrument-authority system 140 processes the information compiled at Block 240 through a predetermined rule set stored in one or more databases (e.g., database 122, etc.) to evaluate, optionally in real-time, whether the request(s) received at Block 210 is potentially unauthorized or fraudulent. If determined to be potentially unauthorized or fraudulent activity at Block 260, instrument-authority system 140 sets a "flag" at Block 280 in one or more databases (e.g., database 124, etc.).

Once a flag is set, optional steps may be taken at Block 285 to minimize the potential unauthorized or fraudulent use of stored-value instruments. Such optional steps may include, e.g., blocking a flagged ANI designation or IP address from further access to an automated request system; placing a hold on a stored-value instrument identifier; deactivating a stored-value identifier; initiating a fraud watch or investigation associated with a flagged ANI designation, IP address or stored-value instrument identifier; or transmitting a message or message code to the point of origination of the request(s) at Block 210 indicating that the stored-value instrument requires verification and/or authentication.

By way of example, suitable rules for use at Block 260 include (i) no more than a selectable number of balance inquiries related to a single stored-value instrument identifier during a selectable period of time; (ii) no more than a selectable number of balance inquiries from a single automatic number identification (ANI) designation or internet protocol (IP) address during a selectable period of time; (iii) no more than a selectable number of transactions of a selectable value in a selectable geographic locale; (iv) no more than a selectable number of transaction requests related to an inactive stored-value instrument identifier; (v) no more than a selectable number of transaction requests related to a stored-value instrument identifier associated with a zero balance; (vi) no more than a selectable number of transaction requests related to a single stored-value instrument identifier from POS terminals during a selectable period of time; and (vii) no more than a selectable number of activation requests related to a single stored-value instrument identifier. The selectable parameters may be hardcoded into the database, or may be selectable by a user and input via, e.g., computing device 132.

By way of example, in one embodiment, no more than 1-10, 3-10, 1-5, 3-5, 3, etc. balance inquires; or no more than 1-10, 3-10, 1-5, 3-5, 3, etc. transactions of a $1, $2, $3, etc. amount or related to an inactive, zero balance, or single stored-value instrument identifier. Exemplary selectable periods of time include 1 hour, 2 hours, 3 hours, 4 hours, 5 hours, 6 hours, 12 hours, 24 hours, 48 hours, etc. Exemplary geographic locales include 1 mile, 2 miles, 3 miles, 4 miles, 5 miles, 10 miles, 25 miles, etc. Also a selectable parameter within the rule set is the type of request to monitor or process through the rule set. For instance, if desired, only requests originating from the IVR, POS, internet, batch files, back-office, or any combination thereof, may be monitored. Further, if desired, only requests originating from selected IVR, POS, etc. locations may be monitored (e.g., unmanned POS locations). By way of example, requests from the IVR and internet may be monitored, but not POS, or alternatively any combination of: one POS only, all (POS, internet, BATCH, Back-office), some (IVR and POS), etc.

As such, in one embodiment, a rule may relate to detecting repeated balance inquiries related to the same stored-value card identifier or originating from the same point of origin (i.e., as identified by ANI or IP address identification). In another embodiment, a rule may relate to detecting a series of small transactions (e.g., $1) in a small geographic location (e.g., within 5 miles). In yet another embodiment, a rule may relate to detecting repeated balance inquiries or transaction attempts related to an inactive stored-value instrument identifier (e.g., a yet to be activated card). In yet another embodiment, a rule may relate to detecting repeated balance inquires or transaction attempts related to a stored-value instrument identifier associated with a zero balance. In yet another embodiment, a rule may relate to detecting repeated attempts to "activate" a single stored-value identifier. By way of example, multiple activations of a single identifier may indicate an attempt to fraudulently "skim" multiple activations (and thereby funds) onto a single identifier. In such a scheme, a single identifier may be fraudulently associated with multiple physical stored-value cards. Upon activation of each individual physical stored-value card, the associated identifier is "loaded" with funds.

Without intending to be limited by theory, such rules are, in part, designed to detect potential unauthorized or fraudulent "skimming" of stored-value instruments in that the rules monitor for repeated requests related a single stored-value instrument identifier or repeated requests from a single source location (or geographic locale). Such repeated requests are often indicative of skimming schemes and other fraudulent activities involving stored-value instruments.

Exemplary embodiments of the invention may therefore comprise, at Block 210, receiving at least one balance inquiry via an automated telephone inquiry system, and at Block 220 and 230, the captured and compiled information may comprises an ANI designation of the source of the at least one request. In another exemplary embodiment, the at least one request received at Block 210 may be a balance inquiry received via an on-line automated balance inquiry system, and the captured and compiled information at Blocks 220 and 230 may comprise IP address information.

In yet another exemplary embodiment, the at least one request received at Block 210 may be a plurality of transaction attempts of a predetermined small increment originating from a predetermined small geographic region, and the captured and compiled information at Block 220 and 230 may comprise the geographic location of origin of each transaction request. The plurality of transaction attempts may originate, e.g., from POS terminals. Further, the plurality of transaction attempts may be related to a single stored-value instrument identifier, or may be related to a plurality of stored-value instrument identifiers, for example, those with sequential identifiers.

Figure 3:
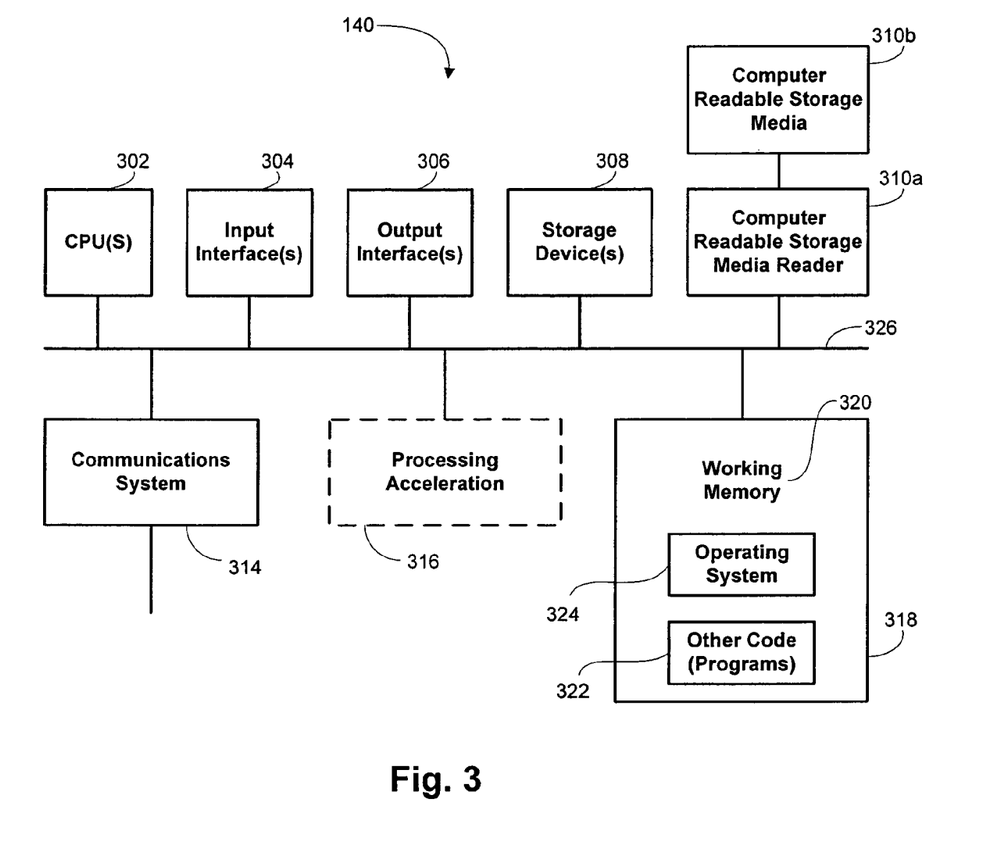
FIG. 3 illustrates an exemplary instrument-authority system of the invention.

FIG. 3 provides a schematic illustration of a structure that may be used to implement the instrument-authority system 140 of the invention as unit for use, e.g., at a merchant location 112. FIG. 3 broadly illustrates how individual system elements may be implemented in a separated or more integrated manner. The instrument-authority system 140 is shown comprised of hardware elements that are electrically coupled via bus 326, including a processor 302, an input interface 304, an output interface 306, a storage device 308, a computer-readable storage media reader 310*a*, a communications system 314, a processing acceleration unit 316 such as a DSP or special-purpose processor, and a memory 318. The computer-readable storage media reader 310*a* is further connected to a computer-readable storage medium 310*b*, the combination comprehensively representing remote, local, fixed, and/or removable storage devices plus storage media for temporarily and/or more permanently containing computer-readable information.

The instrument-authority system 140 also comprises software elements, shown as being currently located within working memory 320, including an operating system 324 and other code 322, such as a program designed to implement the rule set of the present invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

As mentioned above, in one embodiment, the systems and methods of the invention may be used to detect potential unauthorized or fraudulent use of stored-value instruments in real-time. In accordance with the invention, transaction and inquiry requests are monitored in real-time, and information related to these requests are captured, compiled, and processed through a rule set to build a real-time database of request activity. Based on this real-time monitoring and the predetermined, selectable rule set, determinations concerning the potential likelihood of unauthorized or fraudulent activity can be made. "Flags" can then be set in the system, and the flags can optionally be acted in on a variety of ways in order to minimize the potential for unauthorized or fraudulent use of stored-value instruments.

It should be noted that the methods, systems and devices discussed above are intended merely to be exemplary in nature. Consequently, various embodiments may omit, substitute and/or add various procedures and/or components as appropriate. For example, it should be appreciated that in alternative embodiments, the methods may be performed in an order different than that described. It should also be appreciated that the methods described above may be performed by hardware components and/or software programs, and thus may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices (such as a point-of-sale terminal, host system and/or instrument-authority system). Alternatively, the methods may be performed by a combination of hardware and software.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for detecting potential unauthorized or fraudulent use of a stored value instrument, said method comprising:
   providing a database comprising a predetermined rule set;
   receiving at least one request related to at least one stored value instrument identifier;
   compiling information concerning said request based on the type of request made;
   processing said compiled information through said predetermined rule set to thereby determine whether there is a likelihood of potential unauthorized or fraudulent use of said at least one stored value instrument based on said predetermined rule set; and
   setting a flag if potentially unauthorized or fraudulent use of said stored-value instrument is detected in accordance with said predetermined rule set; and wherein the predetermined rule set comprises at least one of:
(i) no more than a predetermined number of balance inquiries related to a single stored-value instrument identifier during a predetermined period of time;
(ii) no more than a predetermined number of balance inquiries from a single ANI designation or IP address during a predetermined period of time;
(iii) no more than a predetermined number of transactions of a predetermined value in a predetermined geographic locale during a predetermined period of time;
(iv) no more than a predetermined number of transaction requests related to an inactive stored-value instrument identifier;
(v) no more than a predetermined number of transaction requests related to a stored-value instrument identifier associated with a zero balance;
(vi) no more than a predetermined number of transaction requests related to a single stored-value instrument identifier from POS terminals during a predetermined period of time; and
(vii) no more than a predetermined number of activation requests related to a single stored-value instrument identifier.

2. The method of claim 1, wherein said compiled predetermined information comprises: stored value instrument identifier, date of request, time of request, request type, mode of request, and optionally geographic location of origin of request, point of service (POS) identifier, automatic number identification (ANI) designation, or internet protocol (IP) address.

3. The method of claim 1, wherein said at least one request is a balance inquiry received via an automated telephone inquiry system, and the compiled predetermined information comprises an ANI designation.

4. The method of claim 1, wherein said at least one request is a balance inquiry received via an on-line automated balance inquiry system, and the compiled predetermined information comprises IP address information.

5. The method of claim 1, wherein said at least one request is a plurality of transaction attempts of a predetermined small increment originating from a predetermined small geographic region, and the compiled predetermined information comprises geographic location of origination of each respective request.

6. The method of claim 1, wherein said at least one request is a plurality of transaction attempts related to a single stored value instrument identifier at point of service terminals.

7. The method of claim 1, wherein the at least one request is a plurality of requests that relate to a single stored value instrument identifier.

8. The method of claim 1, wherein the at least one request is a plurality of requests that relate to a plurality of stored value instrument identifiers.

9. The method of claim 8, wherein the plurality of stored value instrument identifiers are in sequential order.

10. The method of claim 1, wherein said flagging of said at least one stored-value instrument identifier results in deactivation of said stored-value instrument identifier number and any stored-value instruments associated therewith.

11. The method of claim 1, wherein said flagging of said at least one stored-value instrument identifier results in a hold being placed on said stored-value instrument identifier, and any stored-value instruments associated therewith.

12. The method of claim 1, wherein said method further comprising transmitting a message or message code to the point of origination of the at least one request that the stored-value instrument requires verification and/or authorization.

13. The method of claim 1, wherein receiving at least one request comprises a plurality of balance inquiries received from a single source, as identified by ANI or IP address identification, and said method further comprises blocking said source from attempting further balance inquiries.

14. The method of claim 1, wherein said method further comprises flagging a source as identified by ANI or IP address identification for fraud watch or investigation.

15. A system for detecting potential unauthorized or fraudulent use of a stored-value instrument, said system comprising:
means for receiving at least one request related to at least one stored-value instrument identifier number;
means for capturing predetermined information concerning said at least one request based on the type of request made;
a database comprising a rule set useful to determine whether there is a likelihood of potential unauthorized or fraudulent use of said at least one stored value instrument based on said predetermined rule set; and
means for setting a flag if potential unauthorized or fraudulent use of said stored-value instrument is detected in accordance with said predetermined rule set; and
wherein the predetermined rule set comprises at least one of:
(i) no more than a predetermined number of balance inquiries related to a single stored-value instrument identifier during a predetermined period of time;
(ii) no more than a predetermined number of balance inquiries from a single ANI designation or IP address during a predetermined period of time;
(iii) no more than a predetermined number of transactions of a predetermined value in a predetermined geographic locale during a predetermined period of time;
(iv) no more than a predetermined number of transaction requests related to an inactive stored-value instrument identifier;
(v) no more than a predetermined number of transaction requests related to a stored-value instrument identifier associated with a zero balance;
(vi) no more than a predetermined number of transaction requests related to a single stored-value instrument identifier from POS terminals during a predetermined period of time; and
(vii) no more than a predetermined number of activation requests related to a single stored-value instrument identifier.

16. The system of claim 15, wherein said means for receiving at least one request is selected from the group consisting of: an automated telephone balance inquiry system, an on-line balance inquiry system, a POS terminal, or a combination thereof.

17. The system of claim 15, wherein said means for capturing information comprises a means selected from the group consisting of: ANI, IP address capture, and combinations thereof.

18. The system of claim 15, wherein said means for flagging comprises a database comprising said captured information related to said request, and said flag comprises a data flag set in said database if potential unauthorized or fraudulent use of said stored-value instrument is detected in accordance with said predetermined rule set.

* * * * *